United States Patent [19]
Tretter, Jr. et al.

[11] 3,853,505
[45] Dec. 10, 1974

[54] REMOVAL OF HAZE-FORMING CONSTITUENTS FROM WOOD DRYER EFFLUENT

[75] Inventors: Vincent J. Tretter, Jr., Vancouver, Wash.; Leslie M. Stefensen, Springfield; Robert A. Rydell, Corvallis, both of Oreg.

[73] Assignee: Georgia-Pacific Corporation, Portland, Oreg.

[22] Filed: July 16, 1973

[21] Appl. No.: 379,325

[52] U.S. Cl............................ 55/85, 55/89, 55/257, 55/259
[51] Int. Cl...................... B01d 53/14, F26b 21/06
[58] Field of Search.......... 34/32, 75, 79; 55/84, 85, 55/89, 90, , 223, 228, 229, 233, 235, 238, 257, 259

[56] References Cited
UNITED STATES PATENTS

| | | |
|---|---|---|
| 2,857,979 | 10/1958 | Van Dijck............................ 55/431 |
| 2,935,375 | 5/1960 | Boucher................................ 55/84 |
| 3,358,413 | 12/1967 | Kalika................................ 55/238 |
| 3,494,109 | 2/1970 | Blazer et al.......................... 55/257 |
| 3,630,030 | 12/1971 | Wagner................................ 55/257 |

Primary Examiner—Charles N. Hart
Attorney, Agent, or Firm—Peter P. Chevis

[57] ABSTRACT

A process and apparatus are disclosed for the removal of haze-forming constituents from wood veneer dryer effluent by condensing the haze-forming constituents, agglomerating the condensed constituents and removing them from the effluent.

12 Claims, 3 Drawing Figures

PATENTED DEC 10 1974 3,853,505

REMOVAL OF HAZE-FORMING CONSTITUENTS FROM WOOD DRYER EFFLUENT

This invention pertains to a process and equipment for the removal of haze-forming constituents from wood dryer effluents. More particularly, it pertains to a process and equipment wherein the haze-forming constituents are condensed by injection of water spray into the effluent, agglomerated in presence of the water, and removed from the effluent.

In drying of plywood veneers, generally forced-air circulation dryers are used. These dryers are operated under controlled conditions employing temperatures up to 500° F and higher to dry the relatively thin veneers in a matter of minutes. When the dryers are used for drying many of the common species of wood, hydrocarbon wood extractives are also vaporized. A portion of the extractives are volatile hydrocarbons similar to the hydrocarbons released by growing vegetation. Higher molecular weight, condensable extractives are also vaporized which are mainly responsible for a blue haze or plume obtained above the stack upon discharge of the effluent in the air. The haze is particularly pronounced for Douglas Fir and pine veneers which are the principal woods used in plywood production. A presence of the blue haze or visible cloud or plume is aesthetically objectionable, especially in view of the emphasis on pollution abatement.

It is, therefore, an object of this invention to provide a process and apparatus for the treatment of a wood dryer effluent to eliminate the haze-forming constituents from the effluent. A further object is to provide a process for the condensation and recovery of haze-forming wood extractives vaporized upon drying of wood and to provide equipment therefor requiring minimum maintenance.

The above and other objects are attained according to this invention by passing the dryer effluent through a conduit preferably downwardly inclined, spraying water into the effluent in a sufficient amount to disperse within the effluent at least 10 grains of water per cubic foot of effluent and to cool the effluent to a temperature below the condensation temperature of the haze-forming extractives in the range of from 120° to 180° F, preferably 130° to 160° F, passing the cooled effluent containing the water under turbulent flow through the conduit for a distance to obtain at least a pressure drop of ½ inch of water to agglomerate the condensed haze-forming constituents in the presence of the dispersed water and then removing the water and the agglomerated and haze-forming constituents from the effluent.

The haze-forming constituents, or the condensed extractives, apparently are condensation or polymerization products of extractives volatilized from the wood. Under the more severe drying conditions of plywood veneer dryers, particular terpenes or other reactive constituents are volatilized, which if not resinous themselves, will normally react with each other at the high temperatures to form resinous, varnish-like materials that adhere tenaciously to surfaces making the recovery and condensation of these materials by ordinary means impractical. The amount of the condensable haze-forming constituents present in the effluent is relatively small. From about 0.1 to about 0.8 pound, and in some instances to over a pound, of the hazeforming extractive products may be condensed from the amount of effluent used to dry the quantity of veneer required for preparation of 1,000 square feet of 3/8 inch plywood. Under normal dryer operations, large volumes of air are used so that the haze-forming extractives are generally present in the effluent in an amount of from about .01 to 0.1 grains per cubic foot. Cooling the effluent containing the low concentration of extractives rapidly, as inherently obtained by using large amounts of water, results in the condensation of the extractives in an extremely fine particle size of less than one micron which cannot be removed from the effluent by use of normal scrubbing equipment. Thus, after cooling the effluent, it is passed in the conduit under turbulent conditions to agglomerate the condensed constituents, in presence of the dispersed water, to a particle size which can be reasonably removed.

It is essential that the water be dispersed in the effluent in an amount of at least 10 grains per cubic foot of the effluent in order to effect the agglomeration by practical means. Apparently, increasing the concentration of the particles dispersed in the effluent by dispersion of the water enhances the agglomeration of the condensed haze-forming constituents. Thus, the water is sprayed into the effluent not only to cool the effluent but also to increase the concentration of dispersed particles in the effluent. Preferably, sufficient amount of water is added to the effluent to disperse, in fine particle form, from about 100 to 400 grains of water per cubic foot of the effluent under the cooled conditions. Larger amounts may also be used, the amount being limited mainly by the practicality and inconvenience of handling the larger amounts of water.

In addition to enhancing the agglomeration of the condensed extractives, the cooling and the agglomeration of the extractives in the presence of relatively large amounts of dispersed water modifies the properties of the product. Cooling the effluent by ordinary means, such as a heat exchanger, results in obtaining a highly viscous or resinous, varnish-like material which adheres to all surfaces with which it comes into contact coating the surface. However, when the haze-forming constituents are condensed using large amounts of water and agglomerated in the presence of the water, the separated product obtained is of sufficient low viscosity to remain semi-fluid and flow even at room temperatures. The rapid cooling or the dispersion of large amounts of water in the effluent may modify the properties of the extractives or inhibit to a certain extent the polymerization so that a product of lower molecular weight is obtained. A portion of the extractives is water-soluble. Also, in addition to the above, apparently the extractives become partially emulsified, or by other means large amounts of water and air become entrapped in the product during the agglomeration to increase further the fluidity of the product. The product, when first recovered, has a low bulk density but upon standing coalescess or de-aireates to contain up to about 30 precent water. The properties of the agglomerated product can be further modified, if desired, by dispersing other liquids in the effluent in conjunction with the water or adding them to the water. For example, the addition of a small amount of the alcohol, ketones, or aromatic will increase the solubility of the extractives. Also the pH of water may be varied. The solubility of the extractives increase with increase of pH. Under alkaline conditions emulsification also increases. Generally without the above additions, the agglomerated condensed extractives are sufficiently fluid at a temperature of 120° and above to be swept from the surfaces by the turbulent flow of the effluent to permit the recovery of the product by most types of separators normally used for liquid entrainment removal. A high efficiency cyclone-type separator is preferred. Generally, the effluent will contain a limited amount of fiber which may also be very conveniently removed by use of a cyclone separator. After the removal of the majority of the extractives and fiber, it is generally preferred to pass the effluent through additional separators to further agglomerate and remove by impingement or other means the extractives which may still be entrained in the air flow.

Impingement separators, such as screens or equipment which provide an abrupt change in direction of flow of the effluent, including the torturous passage-type separators obtained by assemblies of closely spaced plates of various shapes, are preferred. Other standard types of entrainment separators may also be employed. The amount of the extractives recovered by the latter equipment is relatively small in respect to the amount of water also removed so that the extractives are washed from the equipment without undue problems.

The water and the condensed extractives or haze-forming constituents removed from the effluent may be further processed to separate the extractives from the water and the water recycled to cool additional amounts of effluent. A portion of the water may also be used periodically to wash the entrainment separators. Substantially all of the condensed extractives when initially recovered will float on water, but upon standing a relatively short time, a major portion will coalesce or de-aireate and sink. While various known separators may be used to separate the extractives from water, a convenient method of effecting the separation is to discharge the extractives and water into a tank-type separator equipped with a belt conveyor operating on an incline as shown in FIG. 1. The constituents upon sinking will settle on the belt and will be carried from the tank. The floating constituents are also removed by adhering to the conveyor or belt as the belt or conveyor passes through the floating constituents as it leaves the tank.

The process, equipment, and the various objects and advantages of this invention will be apparent when considered in conjunction with the accompanied drawings in which.

Figure 1:
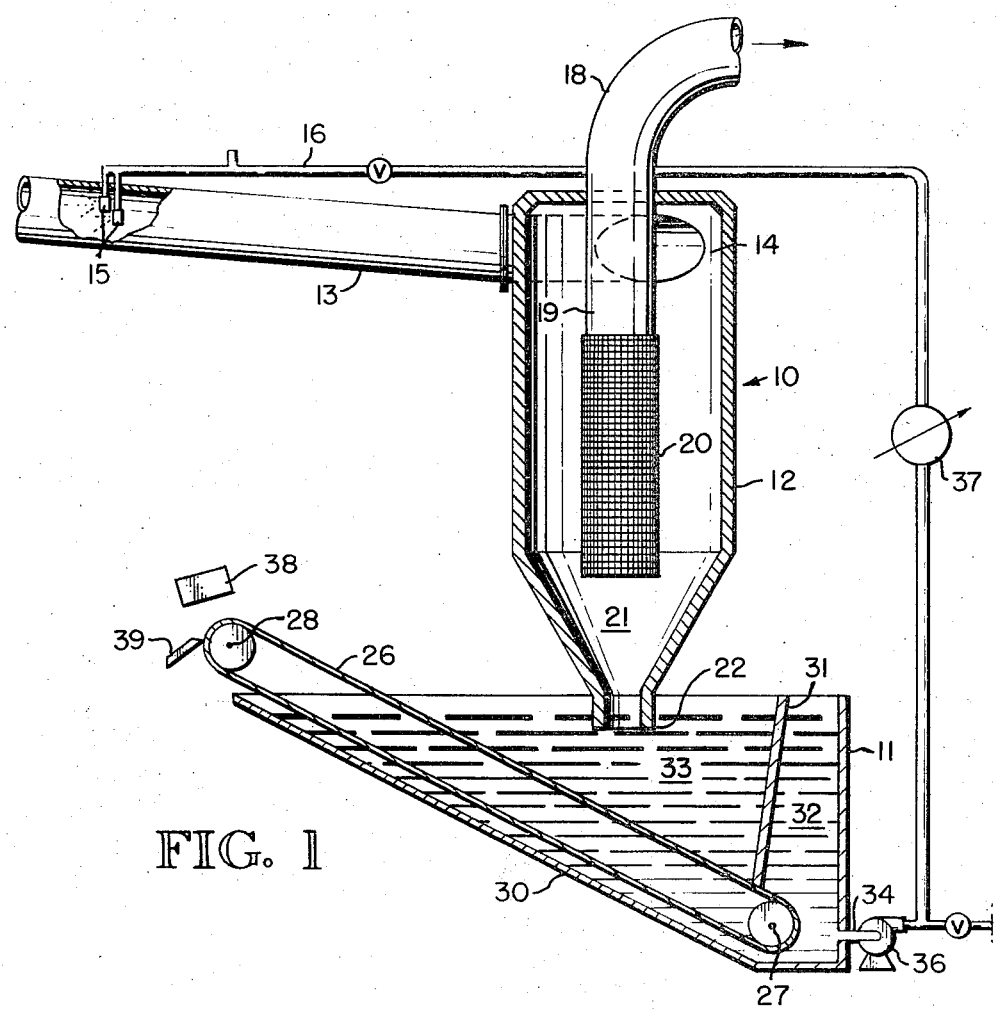
FIG. 1 is a schematic drawing illustrating an assembly of equipment in partial cross-sectional view which may be used for the removal and recovery of the haze-forming constituents from the effluent as well as a separator for the separation of the water from the condensed constituents.

Referring to FIG. 1, a cyclone separator 10 is shown used in combination with a tank-type separator 11. The cyclone separator comprises a cylindrical body 12 having an inlet duct 13. The inlet duct enters the cylindrical body tangentially at a point near the top 14. The inlet duct 13 has water spray nozzles 15 positioned in the duct for the dispersion of water into the incoming effluent. The water spray nozzles are positioned in the conduit at a distance from the entry 14 to provide sufficient distance for the agglomeration of the extractives in the effluent prior to entry into the cyclone separator.

Figure 2:
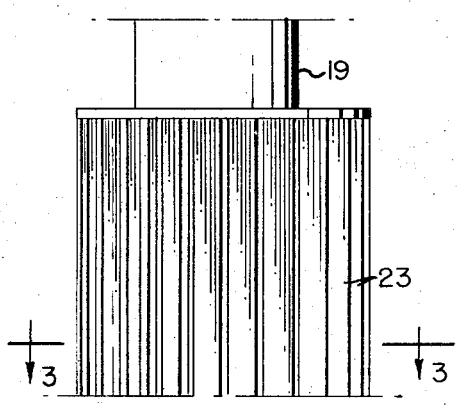
FIG. 2 illustrates one type of impingement separator which may be used in the cyclone separator of FIG. 1.
Figure 3:
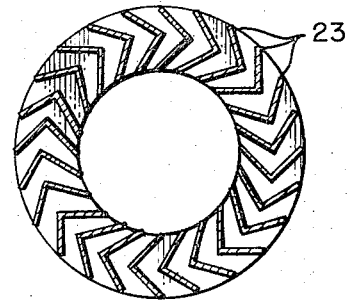
FIG. 3 is a cross-sectional view of the impingement separator of FIG. 2.

Appropriate piping 16 is provided to supply the required water to the nozzles with proper control equipment (not shown) to disperse the required amount of water and to obtain the temperature desired in the conduit. The inlet conduit is positioned usually at an incline of about at least a degree or two, preferably from 10° to 15°, from the horizontal to provide a downwardly approach to separator 10. The angle can be increased to the extent that the inlet conduit is substantially vertical, as long as a 90° bend is provided at the cyclone separator to obtain the horizontal tangential entry into the separator. The effluent is discharged from the top of the cyclone separator through discharge conduit 18 which extends into the cylindrical body from the top with a portion 19 of the conduit extending below the inlet conduit entry 14. Preferably the discharge conduit is equipped with an impingement-type separator 20 through which the effluent passes prior to entry into the discharge conduit, even though additional entrainment equipment may be used outside of the cyclone. As shown in the drawing, the impingement separator 20 is a wire-mesh screen extending through the cylindrical body and into the conical bottom portion of the cyclone where the diameter of the cylindrical body is progressively decreased to form discharge opening 22 at the bottom of the cylindrical body from which the liquid constituents, comprising the haze-forming constituents and water removed from the effluent, are discharged. The wire-mesh screen is a simple, inexpensive type impingement separator which may be used. It has an advantage over many separators in that the wire-mesh has some flexibility resulting in movement of the screen during operation which enhances the removal of the haze-forming constituents agglomerated on the screen. However, in place of the wire-mesh screen, other type of impingement separators which provide surfaces for the impingement of the flowing effluent or change in direction of flow may be used. For example, a conduit containing a multiplicity of holes, or an assembly of closely spaced rods, or preferably closely spaced plates providing a change in direction of flows such as the angle plates 23 schematically illustrated in FIGS. 2 and 3 may be employed. The effluent is drawn through the cyclone by means of a fan or blower (not shown) communicating with effluent discharge conduit 18. The haze-forming constituents and water removed by the cyclone separator are discharged through discharge opening 22 to be further processed to separate the condensed haze-forming constituents from the water.

As shown in FIG. 1, separator used for the separation of the haze-forming constituents from the water is a sloping-side rectangular tank-type vessel 4 in which a continuous belt or conveyor 26 is positioned on rolls 27 and 28 to move at an incline, usually for convenience at an angle of from 15° to 45°. Roll 27 is located near the bottom of the tank at one end and roll 28 is located over the top of the sloping side 30 of the tank at the opposite end of the tank. A plate 31 partitions the upper portion of the tank into two compartments 32 and 33. Plate 31 extends into the tank from the top to the proximity of belt 26 near the bottom of the tank so that compartment 32 formed by the plate encompasses a portion of the belt at the greatest depth in the tank. A discharge 34 near the bottom of compartment 32 is provided through which water separated from the haze-forming constituents may be removed or recycled through pipe 16 by means of pump 36. The water recycled may be cooled if necessary by heat exchanger 37. The liquid level in the tank is maintained at a predetermined height by means of liquid level control instrumentation (not shown) or other methods obvious to people skilled in the art.

Tank 11 is positioned with respect to cyclone 10 such that discharge opening 22 is above belt 26 and below the liquid level in the tank in compartment 33 or the compartment in which the belt emerges from the tank. A radiant heater 38 placed above belt 26 heats a portion of the belt above the tank before the belt passes by knife-edge scraper 39.

It is obvious that other arrangements may be used for the separation of the condensed extractives from the water in place of a tank having a belt operating on an incline. For example, a skimmer may be used to remove the floating constituents, and an auger-type conveyor or a scraper moving along the sloping side or bottom used to remove the extractives settling in the tank.

In operation of the apparatus as shown, the effluent from the veneer dryer at a temperature in the range of from 250° to 500° F is passed into the conduit under turbulent conditions. Sufficient amount of water is sprayed into the conduit through nozzles 15 to cool the effluent to a temperature in the range of 120° to 180° F to condense the haze-forming constituents and to disperse water in fine droplet size in the effluent. The effluent coming from the dryer contains substantial amounts of moisture so that only a relatively small portion of the water sprayed into the conduit vaporizes. Thus, most of the water remains dispersed in the effluent.

The effluent containing the water is passed in the conduit under turbulent conditions, usually at a Reynolds number above 10,000, and at a velocity in the range of 10 to 70 feet per second, for a sufficient distance to agglomerate a substantial portion of the condensed extractives. Generally passing the cooled effluent in the conduit for a distance of 30 to 60 feet to obtain a pressure drop of at least ½ inch, preferably 2 to 8 inches of water, will provide sufficient time and energy for the agglomeration. However, if restrictions or bends are placed in the line to increase turbulence, shorter distances may be used. Abrupt changes or restrictions in the line which result in changes in the velocity are advantageous. Additional mixing or turbulence is not only obtained in the areas of high velocity but the discharge of the high velocity streams into the lower velocity areas result in additional agglomeration to take place in these areas of somewhat reduced turbulence. While the actual time for the formation of a larger particle upon contact of two small particles may be instantaneous, sufficient mixing must be provided in order to obtain the required contacts between the fine particles to form the larger particles. This intermixing is very conveniently obtained by the passage of the effluent through the conduit and other fluid flow equipment. At higher velocities, the effluent is subjected to greater turbulence or mixing, requiring a shorter period of time. At lower velocities, longer times are provided at less vigorous mixing. Thus, the dryer loads may be varied considerably without affecting the efficiency of the unit.

The effluent enters the cylindrical body of the separator tangentially at sufficiently high velocity to have the water and the condensed haze-forming constituents separated from the gaseous effluent by centrifugal force. The water and haze-forming constituents flow down the inside surface of the cylindrical body of the cyclone and are discharged through discharge 22. The gaseous effluent separated from the major portion of the agglomerated haze-forming constituents and water is passed through the screen impingement separator where additional agglomeration and removal of the haze-forming constituents and water are obtained prior to discharging the effluent through discharge 18 at the top of the separator. If additional entrainment removal equipment is used outside of the cyclone as separate units, the effluent would be passed through these. Preferably the flow through the additional units would be maintained concurrently or downwardly making the units more self-cleaning.

The agglomerated condensed haze-forming constituents and water removed from the effluent by the cyclone separator are discharged through the discharge opening 22 at the bottom of the cyclone separator into tank 4 above belt 26 in compartment 33. Thus, upon being discharged above belt 26, the haze-forming constituents more dense than water settle in the water and, guided by plate 31, fall on belt 26 to be carried out of the tank by the belt moving on an incline. The constituents floating on the surface are maintained within compartment 33 by means of plate 31 and come into contact and adhere to the belt and the constituents which have settled on the belt as the belt emerges or passes through the top surface of the liquid in the compartment. After emerging from the tank, the haze-forming constituents on the belt are heated by means of radiant heater 40 to simplify the removal of the material by knife-edge scraper 39. The water enters compartment 32 by passing under plate 31 which results in the water being substantially free of haze-forming constituents from which it is recycled to nozzles 15 and also used for the periodic washing of additional separators or other mist removers, if used. The washings may be returned to compartment 33 for the separation of water from the haze-forming constituents washed from these units.

A commercial dryer was operated for several days drying Douglas Fir sapwood veneer at a rate sufficient for the production of about 13,000 square feet per hour of 3/8 inch plywood. The dryer was a gas-heated dryer using sufficient amount of air to provide flow of about 13,900 cubic feet per minute at the conditions of the dryer. Under standard conditions, this flow rate represented about 5,800 standard cubic feet per minute. An assembly of equipment basically similar to that shown in FIG. 1 was used to effect the condensation and removal of the condensable haze-forming extractives. The condensed extractives were recovered at a rate of from about 9 to 10 pounds per hour which contained about 30 percent water.

The effluent leaving the dryer was at an average temperature of around 365° F which was cooled to an average temperature of about 165° F by spraying into the effluent about 30 gallons per minute of water to condense the haze-forming hydrocarbon extractives. Based upon the humidity of the dryer effluent, it was calculated that about 5½ gallons of the water vaporized and the remainder was dispersed or entrained in the effluent to give a concentration of about 120 grains water per cubic foot of the cooled effluent. The spray nozzles were located in the duct about 30 feet from the cyclone separator. The duct was 30 inches in diameter and had a downward slope of about 10°. A restriction consisting of a plate containing a multiplicity of 2-inch holes was also placed in the line. The effluent was passed through the duct at a velocity of about 40 feet per second. A pressure drop of about 3 inches of water was obtained in the duct between the spray nozzles and the entry to the cyclone. When the amount of water sprayed into the effluent was increased to 90 gallons per minute and the temperature reduced to 135° F, the amount of the condensed extractives recovered increased from 9 to 10 pounds per hour to about 13 to 15 pounds per hour.

The cyclone separator employed was equipped with a screen impingement separator attached to the effluent discharge conduit. The effluent leaving the cyclone separator was also passed through an additional mist removing equipment which comprised wire-mesh and other packing to agglomerate and remove additional amounts of the condensables. The effluent was drawn through the equipment by a fan which was exhausting into the atmosphere. The water and condensed haze-forming constituents from the cyclone separator and the mist recovery unit were discharged into a tank-separator where the condensed extractives were removed by use of a moving steel belt and the water recycled to cool and be dispersed in additional effluent. The steel belt in the tank-separator was positioned at an angle of 20°. The haze-forming constituents which settled on the belt and the floating extractives which adhered to the belt as it passed through the surface of the liquid in the tank were removed from the belt by a knife-edge scraper.

What is claimed is:

1. A process for the removal of haze-forming constituents from wood veneer dryer effluent which comprises, passing the effluent through a conduit, spraying water into the effluent in sufficient amount to cool the effluent to a temperature in the range of 120° to 180° F to condense the haze-forming constituents and to disperse water in the effluent in an amount of at least 10 grains per cubic foot of effluent, passing the cooled effluent containing the water spray in the conduit under turbulent flow for a distance to obtain a pressure drop of at least ½ inch of water to agglomerate the condensed haze-forming constituents in presence of the dispersed water, and removing the condensed, agglomerated particles of the haze-forming constituents from the effluent.

2. A process according to claim 1 wherein the water is added to the effluent in an amount to disperse within the effluent from 100 to 400 grains per cubic foot of water.

3. A process according to claim 2 wherein the effluent containing the water spray is passed through a conduit at a Reynolds number above 10,000 until a pressure drop in the range of from 2 to 8 inches of water is obtained.

4. A process according to claim 3 wherein the effluent containing the water is passed in the conduit at a velocity of from 10 to 70 feet per second for a distance of from 30 to 60 feet.

5. A process according to claim 4 wherein the agglomerated haze-forming constituents are removed from the effluent by centrifugal force in a cyclone-type separator.

6. A process according to claim 2 wherein the effluent is cooled to a temperature in the range of 130° to 160° F by the addition of the water and wherein the water separated from the agglomerated haze-forming constituents is recycled by being sprayed into the conduit to cool and to be dispersed in additional effluent coming from the dryer.

7. A process according to claim 6 wherein the water is separated from the condensed, agglomerated haze-forming constituents by discharging the water and the agglomerated, condensed haze-forming constituents into a tank containing water at a predetermined liquid level, removing the haze-forming constituents from said tank by moving a continuous surface at an incline from the bottom of the tank to the top of the tank through said water, said moving surface being below the entry of the water and haze-forming constituents into the tank, and removing the haze-forming constituents from said moving surface.

8. An apparatus for the removal of haze-forming constituents from a wood veneer dryer effluent which comprises, a cyclone separator having a cylindrical body, an inlet conduit communicating tangentially with said cylindrical body for the introduction of said dryer effluent in said body, said inlet conduit extending from said body at an upward incline from the horizontal, a water spray nozzle positioned in said inlet conduit at a point sufficiently distant from said cylindrical body to provide a pressure drop of at least ½ inch of water for the effluent flow in said inlet conduit, means for passage of water through said spray nozzle to cool the effluent and condense said haze-forming constituents, a discharge conduit at the top of the cylindrical body extending into the cylindrical body to a point below the tangential entry of said inlet conduit with a portion of the discharge conduit extending below the entry of the inlet conduit having a multiplicity of passageways with surfaces for impingement of the effluent flowing through the separator prior to entry into the discharge conduit, a discharge opening at the bottom of said cylindrical body for discharge of the condensed haze-forming constituents and water added to cool the effluent, means to pass the dryer effluent through said conduits and cyclone separator, means to separate the water from the condensed haze-forming constituents, and means to recycle said water to said spray nozzle.

9. An apparatus according to claim 8 wherein the multiplicity of passageway with surfaces for impingement is a wire mesh.

10. An apparatus for the removal of haze-forming constituents from a wood veneer dryer effluent which comprises, a cyclone separator having a cylindrical body, an inlet conduit communicating tangentially with said cylindrical body for the introduction of the effluent into said body, said inlet conduit extending from said body at an upwardly incline from the horizontal, a spray nozzle positioned in said inlet conduit at a point sufficiently distant from said cylindrical body to impart a pressure drop of at least ½ inch of water to effluent flow in said inlet conduit, means for passage of water through said spray nozzle to cool said effluent and condense said haze-forming constituents, a discharge conduit at the top of the cylindrical body extending into the cylindrical body to a point below the tangential entry of said inlet conduit for discharge of the effluent, a discharge opening at the bottom of said cylindrical body for discharge from said body of the condensed haze-forming constituents and water added to cool the effluent, means to pass the dryer effluent through said conduit and cyclone separator, means to separate the water from the condensed haze-forming constituents comprising a tank for the confinement of the water and the condensed haze-forming constituents in the tank to a predetermined liquid level, a conveyor belt positoned to move at an incline from the bottom of the tank at one end to the top of the tank at the opposite end of the tank, said tank being positioned in relation to the cyclone separator to have the water and the haze-forming constituents discharged into said tank below the level of the water and haze-forming constituents in the tank and above said continuous belt, means to drive said belt, means at the top of the tank to remove the constituents from the belt, and means to recycle the water from the tank to the spray nozzle in the inlet conduit.

11. An apparatus according to claim 10 wherein the means to remove the constituents from the belt at the top of the tank comprises a scraper adjacent to said belt and a heat source to heat the scraper and the area of the belt of the liquid level in the tank.

12. An apparatus according to claim 11 wherein a portion of the discharge conduit extending below the entry of the inlet conduit in the cylindrical body of the conduit has a multiplicity of passageways with surfaces for impingement of effluent flowing through the separator prior to entry into the discharge conduit.

* * * * *